United States Patent
Hashimoto (10) Patent No.: US 10,451,119 B2
(45) Date of Patent: Oct. 22, 2019

(54) DRIVING FORCE TRANSMITTER, SHEET FEEDING UNIT, AND IMAGE FORMING APPARATUS

(71) Applicant: Brother Kogyo Kabushiki Kaisha, Nagoya-shi, Aichi-ken (JP)

(72) Inventor: Yohei Hashimoto, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 158 days.

(21) Appl. No.: 15/635,732

(22) Filed: Jun. 28, 2017

(65) Prior Publication Data

US 2018/0080505 A1    Mar. 22, 2018

(30) Foreign Application Priority Data

Sep. 20, 2016  (JP) .................. 2016-183493

(51) Int. Cl.
*F16D 23/12*   (2006.01)
*F16D 27/10*   (2006.01)
(Continued)

(52) U.S. Cl.
CPC .......... *F16D 23/12* (2013.01); *B65H 3/0669* (2013.01); *B65H 7/00* (2013.01); *F16D 27/10* (2013.01); *G03G 15/6529* (2013.01); *G03G 21/1647* (2013.01); *B65H 2402/10* (2013.01); *B65H 2403/724* (2013.01); *F16D 2023/123* (2013.01);
(Continued)

(58) Field of Classification Search
CPC .... F16D 23/12; F16D 27/10; F16D 2023/123; G03G 15/6529; G03G 21/1647; G03G 2215/00679; B65H 3/0669; B65H 2402/10; B65H 2403/724
See application file for complete search history.

(56) References Cited

U.S. PATENT DOCUMENTS 1,780,858 A * 11/1930 Bearens .................... F16H 3/08
74/337
7,669,496 B2 * 3/2010 Takahashi ............... F16D 7/044
192/46
(Continued)

FOREIGN PATENT DOCUMENTS

JP   H05-061315 A   3/1993
JP   H08-002735 A   1/1996
(Continued)

*Primary Examiner* — Tinh T Dang
(74) *Attorney, Agent, or Firm* — Banner & Witcoff, Ltd.

(57) ABSTRACT

A driving force transmitter, including a coupling member, a cam member, an electromagnetic clutch, a sensor, and a controller, is provided. The coupling member arranged between a driving source and a driven device includes a first shaft, a second shaft, a stationary coupling member, and a movable coupling member which is movable between a separating position and an engaging position. The cam member is rotatable to move the movable coupling member. The electromagnetic clutch connects the cam member with the driving source when electrically powered and disconnects the cam member when not electrically powered. The sensor detects rotational positions of the cam member. The controller switches the electricity to the electromagnetic clutch according to the rotational positions of the cam member.

4 Claims, 7 Drawing Sheets

(51) Int. Cl.
*B65H 7/02* (2006.01)
*G03G 15/00* (2006.01)
*G03G 21/16* (2006.01)
*B65H 3/06* (2006.01)
*B65H 7/00* (2006.01)

(52) U.S. Cl.
CPC ............ *G03G 2215/00679* (2013.01); *G03G 2221/1657* (2013.01)

(56) References Cited

U.S. PATENT DOCUMENTS

| | | | |
|---|---|---|---|
| 7,963,183 B2* | 6/2011 | Pick ........................ | F16H 61/32 |
| | | | 74/337 |
| 9,354,560 B2* | 5/2016 | Imaizumi ........... | G03G 21/1647 |
| 2009/0185830 A1* | 7/2009 | Kim ................... | G03G 21/0058 |
| | | | 399/222 |
| 2015/0084267 A1* | 3/2015 | Hosohara ................ | B65H 1/14 |
| | | | 271/110 |

FOREIGN PATENT DOCUMENTS

| | | |
|---|---|---|
| JP | 2003-233242 A | 8/2003 |
| JP | 2008-095870 A | 4/2008 |
| JP | 2008-104496 A | 5/2008 |
| JP | 2015-155954 A | 8/2015 |

\* cited by examiner

DRIVING FORCE TRANSMITTER, SHEET FEEDING UNIT, AND IMAGE FORMING APPARATUS

CROSS REFERENCE TO RELATED APPLICATION

This application claims priority from Japanese Patent Application No. 2016-183493, filed on Sep. 20, 2016, the entire subject matter of which is incorporated herein by reference.

BACKGROUND

Technical Field

An aspect of the present disclosure is related to a driving force transmitter for transmitting a driving force, and an extension sheet feeding unit and an image forming apparatus having the driving force transmitter.

Related Art

An image forming apparatus, such as a printer, a copier, and a multifunction peripheral, having a driving source and a drivable device driven by a driving force from the driving source, is known. The driving force from the driving source may be transmitted to the drivable device through an electromagnetic clutch, which may switch the driving force on and off.

For example, an image forming apparatus may have a conveyer roller pair as a drivable device, which may be driven to be rotated by a driving force from a main motor being a drive source. An electromagnetic clutch may be arranged at a position between the main motor and the conveyer roller pair so that the driving force to be transmitted to the conveyer roller pair may be switched on or off by the electromagnetic clutch.

SUMMARY

With the electromagnetic clutch at the position between the main motor and the conveyer roller pair, and with the electromagnetic clutch to switch on or off of the driving force between the main motor and the conveyer roller pair, the electromagnetic clutch may require a certain amount of electric power to be supplied constantly while the conveyer roller pair is being driven. Further, in order for the driving force to be transmitted through the electromagnetic clutch to substantially move the conveyer roller pair, a substantial size of the electromagnetic may be required. In other words, when a load to drive the conveyer roller pair is larger, a larger or a more powerful electromagnetic clutch that may transmit the larger amount of driving force may be required; therefore, an amount of the electric power to be consumed may be increased.

The present disclosure is advantageous in that a driving force transmitter, which may not necessarily require constant power supply to an electromagnetic clutch while a drivable device is being driven, and in which a smaller electromagnetic clutch may be used, so that electric consumption may be moderated, is provided. Further, an extension sheet feeding unit and an image forming apparatus with the drive force transmitter may be provided.

According to an aspect of the present disclosure, a driving force transmitter is provided. The driving force transmitter includes a coupling member arranged between a driving source and a driven device configured to be driven by a driving force from the driving source. States in the coupling member is switchable between a transmittable state, in which the driving force from the driving source is transmitted to the driven device, and a non-transmittable state, in which the driving force from the driving source is not transmitted to the driven device. The coupling member includes a first shaft, a second shaft, a stationary coupling member configured to rotate about the first shaft and a movable coupling member configured to move along an axial direction of the first shaft between a separated position, in which the movable coupling member is separated from the stationary coupling member, and an engaging position, in which the movable coupling member engages with the stationary coupling member to be rotatable integrally with the stationary coupling member. When the coupling member is in the transmittable state, the movable coupling member is at the engaging position, and when the coupling member is in the non-transmittable state, the movable coupling member is at the separated position. The driving force transmitter further includes a cam member configured to be rotated about the second shaft by the driving force from the driving source to move the movable coupling member between the separated position and the engaging position by changing rotational positions thereof, and an electromagnetic clutch arranged between the driving source and the cam member. The electromagnetic clutch is configured to connect the cam member with the driving source when the electromagnetic clutch is electrically powered and to disconnect the cam member from the driving source when the electromagnetic clutch is not electrically powered. The driving force transmitter further includes a sensor configured to detect the rotational positions of the cam member and a controller. The controller supplies electrical power to the electromagnetic clutch to rotate the cam member to switch the states of the coupling member between the transmittable state and the non-transmittable state and stops the electrical power to the electromagnetic clutch after the states of the coupling member are completely switched. The controller switches the electrical power to the electromagnetic clutch according to the rotational positions of the cam member detected by the sensor.

According to another aspect of the present disclosure, a sheet feeding unit configured to be used with an image forming apparatus having a driving source is provided. The sheet feeding unit includes a sheet supporting section configured to support sheets thereon, a separator roller configured to be driven by a driving force from the driving source to separate and convey the sheets supported on the sheet supporting section one by one, and a driving force transmitter. The driving force transmitter includes a coupling member arranged between the driving source and the separator roller. States in the coupling member is switchable between a transmittable state, in which the driving force from the driving source is transmitted to the separator roller, and a non-transmittable state, in which the driving force from the driving source is not transmitted to the separator roller. The coupling member includes a first shaft, a second shaft, a stationary coupling member configured to rotate about the first shaft and a movable coupling member configured to move along an axial direction of the first shaft between a separated position, in which the movable coupling member is separated from the stationary coupling member, and an engaging position, in which the movable coupling member engages with the stationary coupling member and is rotatable integrally with the stationary coupling member. When the coupling member is in the transmittable state, the movable coupling member being at the engaging position, and when the coupling member is in the non-transmittable state, the movable coupling member being at the separated position. The driving force transmitter further includes a cam member, which is configured to be rotated about the second shaft by the driving force from the driving source to move the movable coupling member between the separated position and the engaging position by changing rotational positions thereof, and an electromagnetic clutch arranged between the driving source and the cam member. The electromagnetic clutch is configured to connect the cam member with the driving source when the electromagnetic clutch is electrically powered and to disconnect the cam member from the driving source when the electromagnetic clutch is not electrically powered. The driving force transmitter further includes a sensor configured to detect the rotational positions of the cam member and a controller. The controller supplies electrical power to the electromagnetic clutch to rotate the cam member to switch the states in the coupling member between the transmittable state and the non-transmittable state and stops the electrical power to the electromagnetic clutch after the states in the coupling member are completely switched. The controller switches the electrical power to the electromagnetic clutch according to the rotational positions of the cam member detected by the sensor.

According to still another aspect of the present disclosure, an image forming apparatus, including a driving source, an image forming unit configured to be driven by a driving force from the driving source, a controller, and a driving force transmitter, is provided. The driving force transmitter includes a coupling member arranged between the driving source and the image forming unit. States in the coupling member is switchable between a transmittable state, in which the driving force from the driving source is transmitted to the image forming unit, and a non-transmittable state, in which the driving force from the driving source is not transmitted to the image forming unit. The coupling member includes a first shaft, a second shaft, a stationary coupling member configured to rotate about the first shaft, and a movable coupling member configured to move along an axial direction of the first shaft between a separated position, in which the movable coupling member is separated from the stationary coupling member, and an engaging position, in which the movable coupling member engages with the stationary coupling member and is rotatable integrally with the stationary coupling member. When the coupling member is in the transmittable state, the movable coupling member being at the engaging position; and when the coupling member is in the non-transmittable state, the movable coupling member being at the separated position. The driving force transmitter further includes a cam member, which is configured to be rotated about the second shaft by the driving force from the driving source to move the movable coupling member between the separated position and the engaging position by changing rotational positions thereof, and an electromagnetic clutch arranged between the driving source and the cam member. The electromagnetic clutch is configured to connect the cam member with the driving source when the electromagnetic clutch is electrically powered and to disconnect the cam member from the driving source when the electromagnetic clutch is not electrically powered. The driving force transmitter further includes a sensor configured to detect the rotational positions of the cam member. The controller supplies electrical power to the electromagnetic clutch to rotate the cam member to switch the states in the coupling member between the transmittable state and the non-transmittable state and stops the electrical power to the electromagnetic clutch after the states in the coupling member are completely switched. The controller switches the electrical power to the electromagnetic clutch according to the rotational positions of the cam member detected by the sensor.

DETAILED DESCRIPTION

Hereinafter, an embodiment of the present disclosure will be described with reference to the accompanying drawings.

[Overall Configuration of Image Forming Apparatus]

Figure 1:
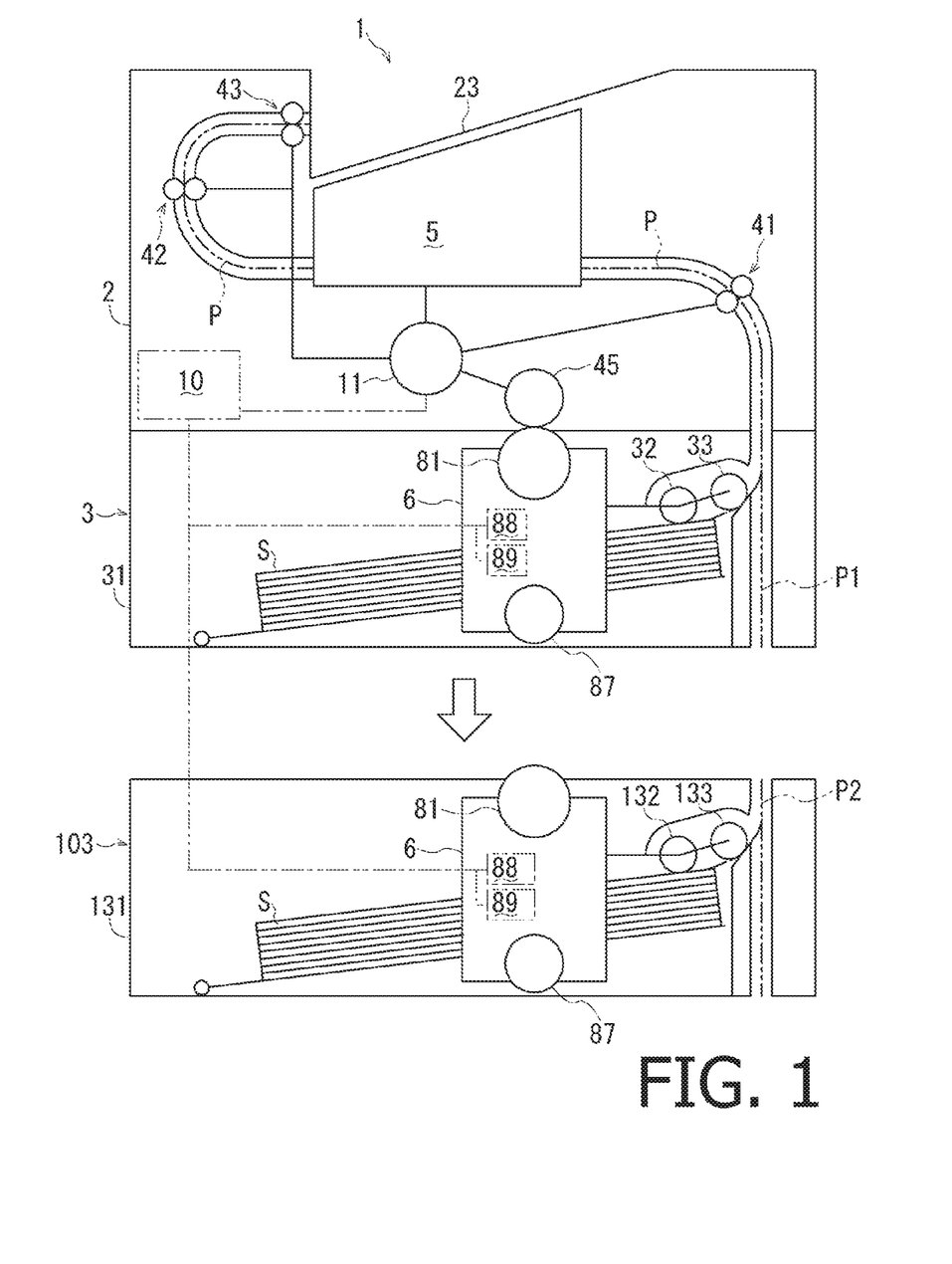
FIG. 1 is an illustrative cross-sectional view of an image forming apparatus with a driving force transmitter and an extension sheet feeder according to an embodiment of the present disclosure.

An image forming apparatus 1 includes, as shown in FIG. 1, a housing 2, a motor 11, an image forming unit 5, a sheet feeder 3, and a controller 10. The motor 11 may generate a driving force to drive the image forming unit 5, and the image forming unit 5 driven by the driving force may form an image on a sheet S. The sheet feeder 3 may feed sheets S to the image forming unit 5. The controller 10 may control behaviors of devices in the image forming apparatus 1 including the motor 11 and the sheet feeder 3. Further, an extension sheet feeder 103, which is formed separately from the image forming apparatus 1 and may feed sheets S to the image forming unit 5, is additionally attachable to the image forming apparatus 1.

In the following description, directions related the image forming apparatus 1 and each part or item included in the image forming apparatus 1 will be mentioned on basis of a user's position to ordinarily use the image forming apparatus 1. For example, in FIG. 1, a viewer's right-hand side and left-hand will be referred to as the user's frontward side and rearward side, respectively. A viewer's nearer side and farther side in FIG. 1 will be referred to as a rightward side and a leftward side for the user to use the image forming apparatus 1, respectively. An up-to-down or down-to-up direction in FIG. 1 may be referred to as a vertical direction, and a front-to-rear or rear-to-front direction may be referred to as a front-rear direction. Further, a left-to-right or right-to-left direction may be referred to as a widthwise direction.

The housing 2 may be in a form of a rectangular box and accommodates the sheet feeder 3, the image forming unit 5, and the motor 11 therein. An upper face of the housing 2 is dented to form a discharge tray 23, which inclines to be lower rearward and higher frontward.

The sheet feeder 3 includes a sheet cassette 31, a feeder roller 32, and a separator roller 33. Inside the housing 2, formed is a conveyer path P, which extends from the sheet cassette 31 through the image forming unit 5 to the discharge tray 23.

The sheet cassette 31 may support one or more sheets S therein in a stack. The sheets S supported in the sheet cassette 31 may be fed by the feeder roller 32 toward the separator roller 33 and separated from one another by the separator roller 33 to be conveyed in the conveyer path P one by one. The sheets S fed in the conveyer path P may be further conveyed by a conveyer roller pair 41, which is located downstream along the conveyer path P from the separator roller 33, toward the image forming unit 5.

The image forming unit 5 is arranged at an upper position with respect to the sheet cassette 31 and may form an image on a surface of the sheet S conveyed from the sheet feeder 3. The sheet S with the image formed on the surface thereof is conveyed to exit the image forming unit 5 and further conveyed downstream along the conveyer path P by a conveyer roller pair 42, which is arranged downstream from the image forming unit 5 along the conveyer path P. The sheet S conveyed by the conveyer roller pair 42 is passed to a discharge roller pair 43 to be conveyed further downstream to be discharged out of the conveyer path P and rest in the discharge tray 23.

The image forming unit 5, the conveyer roller pair 41, the conveyer roller pair 42, and the discharge roller pair 43 are connected with the motor 11 to be driven by the motor 11. Meanwhile, the motor 11 is further connected with an output gear 45, which may output the driving force from the motor 11 to the sheet feeder 3. The motor 11 is further connected with the controller 10, and behaviors of the motor 11 are controlled by the controller 10.

The sheet feeder 3 includes a driving force transmitter 6, which may transmit the driving force from the motor 11 to the feeder roller 32 and the separator roller 33. The driving force transmitter 6 includes an input gear 81, which is meshed with the output gear 45, and an output gear 87, which may output the driving force input to the driving force transmitter 6. Thus, the driving force from the motor 11 may be input to the driving force transmitter 6 through the input gear 81 and output through the output gear 87 to the feeder roller 32 and the separator roller 33. Meanwhile, the output gear 87 may likewise output the driving force from the motor 11 to the extension sheet feeder 103.

The extension sheet feeder 103 includes a sheet cassette 131, a feeder roller 132, and a separator roller 133. The sheet cassette 131 may support one or more sheets S therein in a stack. When the extension sheet feeder 103 is attached to the image forming apparatus 1, the sheets S supported in the sheet cassette 131 may be fed by the feeder roller 132 toward the separator roller 133 and separated from one another by the separator roller 133 to be conveyed in a conveyer path P2, which is formed in the extension sheet feeder 103.

The sheets S fed in the conveyer path P2 may be further conveyed to a conveyer path P1, which is formed in the sheet feeder 3. The conveyer path P1 is merged with the conveyer path P at a position downstream from the separator roller 33 and upstream from the conveyer roller pair 41. The sheet S conveyed through the conveyer path P1 to the conveyer path P may be further conveyed in the conveyer path P toward the image forming unit 5.

The extension sheet feeder 103 includes a driving force transmitter 6, which may transmit the driving force from the motor 11 to the feeder roller 132 and the separator roller 133. The driving force transmitter 6 includes an input gear 81, which is meshed with the output gear 87 in the driving force transmitter 6 in the sheet feeder 3 so that the driving force from the motor 11 may be transmitted to the input gear 81 in the extension sheet feeder 103 through the output gear 87 in the driving force transmitter of the sheet feeder 3.

The extension sheet feeder 103 is stackable so that multiple extension sheet feeders 103 may be attached to the image forming apparatus 1. When the extension sheet feeders 103 are stacked to be attached to the image forming apparatus 1, the output gear 87 in the driving force transmitter 6 in an upper one of the extension sheet feeders 103 may mesh with the input gear 81 in the driving force transmitter 6 in a lower one of the extension sheet feeders 103 so that the driving force from the motor 11 may be transmitted from the upper one of the extension sheet feeders 103 to the lower one of the extension sheet feeders 103.

[Configuration of the Driving Force Transmitter]

Figure 2:
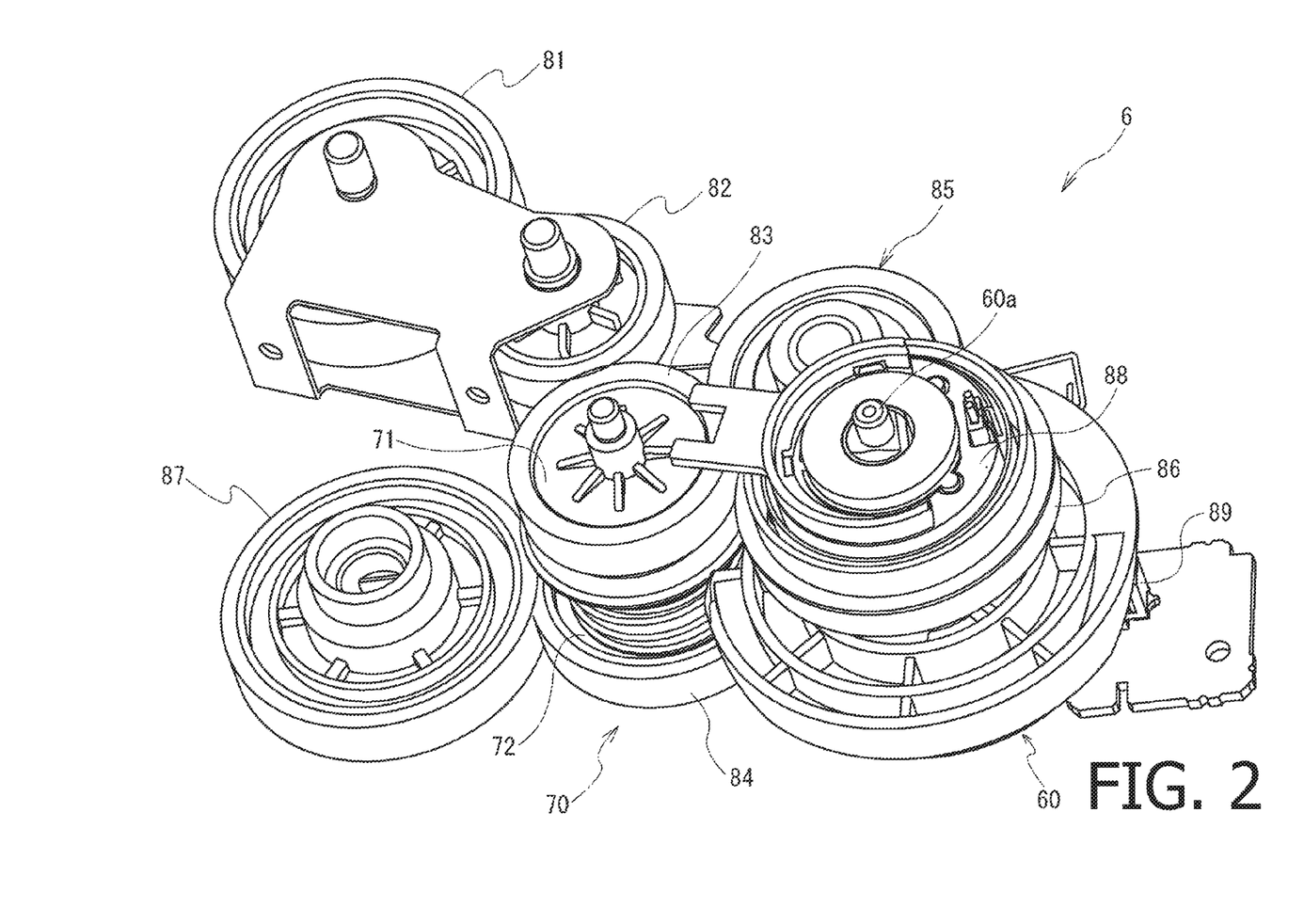
FIG. 2 is a perspective view of the driving force transmitter according to the embodiment of the present disclosure.

Below will be described configuration of the driving force transmitter 6. As shown in FIG. 2, the driving force transmitter 6 includes the input gear 81 mentioned above, an idle gear 82, a driver-side gear 83, a driven-side gear 84, an idle gear 85, a cam-driver gear 86, and the output gear 87 mentioned above. The input gear 81 is meshed with the idle gear 82, the idle gear 82 is meshed with the driver-side gear 83, the driver-side gear 83 is coaxial with the driven-side gear 84 and is meshed with the idle gear 85, and the idle gear 85 is meshed with the cam-driver gear 86. The driven-side gear 84 is meshed with the output gear 87.

The driving force transmitter 6 further includes a coupling member 70, a cam member 60, an electromagnetic clutch 88, and a photo sensor 89. The coupling member 70 may be placed in one of a transmittable state, in which the driver-side gear 83 and the driven-side gear 84 are engaged with each other to be integrally rotatable so that the driving force from the motor 11 may be transmitted from the driver-side gear 83 to the driven-side gear 84, and a non-transmittable state, in which the driver-side gear 83 and the driven-side gear 84 are separated from each other so that the driving force from the motor 11 may not be transmitted from the driver-side gear 83 to the driven-side gear 84. In other words, the transmitting states concerning transmission of the driving force from the motor 11 through the driver-side gear 83 to the driven-side gear 84 are switchable. The cam member 60 may be driven by the cam-driver gear 86 to rotate to change rotational positions thereof. The electromagnetic clutch 88 is interposed between the cam-driver gear 86 and the cam member 60 to switch connection and disconnection between the cam driver gear 86 and the cam member 60. The photo sensor 89 may detect a rotational position of the cam member 60.

As shown in FIGS. 2-6, the coupling member 70 includes a stationary coupling member 71 and a movable coupling member 72. The stationary coupling member 71 is rotatable about a stationary rotation shaft 71*a* together with the driver-side gear 83, which is fitted around a circumference of the stationary coupling member 71. The movable coupling member 72 is movable linearly to be closer to or farther from the rotation shaft 71*a* of the stationary coupling member 71 to be engaged with or separated from the stationary coupling member 71.

The movable coupling member 72 includes a coupling body 72*b*, an engageable claw 72*d*, a joint 72*c*, and a spring 72*f*. The coupling body 72*b* is rotatable about a rotation shaft 72*a* together with the driven-side gear 84, which is fitted around a circumference of the coupling body 72*b*. The engageable claw 72*d* may be in a cylindrical shape and is engageable with the stationary coupling member 71. The joint 72*c* includes a flange 72*e*, which expands outward farther than the engageable claw 72*d*. The spring 72*f* is interposed between the coupling body 72*b* and the joint 72*c* and may urge the joint 72*c* toward the stationary coupling member 71.

The rotation shaft 72*a* is arranged to extend in parallel and coaxially with the rotation shaft 71*a*. The joint 72*c* is rotatable integrally with the coupling body 72*b* about the rotation shaft 72*a* and is movable to be closer to or farther from the rotation shaft 71*a*. The joint 72*c* moving to be closer to or farther from the rotation shaft 71*a* may cause the engageable claw 72*d* to be engaged with or separated from stationary coupling member 71.

The joint 72*c* is, in a natural state where no external force along an axial direction of the rotation shaft 71*a* is applied to the joint 72*c*, urged by an urging force of the spring 72*f* toward the stationary coupling member 71 and inserted in the stationary coupling member 71. While the joint 72*c* is inserted in the stationary coupling member 71, the engageable claw 72*d* in the stationary coupling member 71 and the movable coupling member 72 are integrally rotatable.

While the engageable claw 72*d* is engaged with the stationary coupling member 71, the stationary coupling member 71 and the movable coupling member 72 are enabled to rotate integrally. In other words, the engagement between the stationary coupling member 71 and the movable coupling member 72 may form the transmittable state in the coupling member 70. Thus, the coupling member 70 is placed in the transmittable state, in which the driving force from the motor 11 input to the driver-side gear 83 is transmittable to the driven-side gear 84. The driving force transmitted to the driven-side gear 84 is transmitted to the feeder roller 32 and the separator roller 33 through the output gear 87.

Meanwhile, when the joint 72*c* is urged by an external force along the axial direction of the rotation shaft 71*a* toward the coupling body 72*b*, the joint 72*c* may move to be closer to the coupling body 72*b* against the urging force of the spring 72*f* and detached from the coupling member 71. Thus, the engageable claw 72*d* in the joint 72*c* is separated from the stationary coupling member 71.

While the engageable claw 72*d* and the stationary coupling member 71 are separated, the stationary coupling member 71 and the movable coupling member 72 may form the non-transmittable condition in the coupling member 70. Thus, the coupling member 70 is placed in the non-transmittable state, in which the driving force from the motor 11 input to the driver-side gear 83 is not transmitted to the driven-side gear 84. Therefore, the driving force from the motor 11 is not transmitted to the feeder roller 32 or the separator roller 33.

Thus, the coupling member 70 is arranged in the position between the motor 11 being the driving source and the feeder roller 32 and the separator roller 33 being the drivable devices to switch the states of the driving force between the transmittable states, in which the driving force from the motor 11 may be transmitted to the feeder roller 32 and the separator roller 33, and the non-transmittable states, in which the driving force may not be transmitted to the feeder roller 32 or the separator roller 33.

As shown in FIG. 3-8, the cam member 60 includes a cam body 61 and a detectable piece 62. The cam body 61 is formed in an approximate shape of a disk. The detectable piece 62 is formed in a shape of a partly-cutaway ring, which protrudes from a surface of the cam part 61 in an axial direction of a rotation shaft 60*a*. The detectable piece 62 is rotatable about the rotation shaft 60*a*. The rotation shaft 60*a* axially extends in parallel with the rotation shaft 71*a*. The cam member 60 is driven by the driving force from the motor 11 to rotate in a first rotating direction, e.g., counter-clockwise in FIGS. 4 and 6.

The cam body 61 is arranged at a position to partly overlap the flange 72*e* of the movable coupling member 72 in a view along the rotation shaft 60*a*. While the cam body 61 rotates about the rotation shaft 60*a*, the cam body 61 may be located either at a separated rotational position, in which the cam body 61 is separated from the flange 72*e* in the movable coupling member 72, and a pressurizing rotational position, in which the cam body 61 contacts the flange 72*e* to press the flange 72*e* toward the coupling body 72*b*.

The cam body 61 includes a separating cam face 61*a*, a contacting cam face 61*b*, a first oblique cam face 61*c*, and a second oblique cam face 61*d*, which are formed on a surface of the cam body 61 that confronts with the flange 72*e*. The contacting cam face 61*b* may contact the flange 72*e* in the movable coupling member 72 when the cam member 60 is in the pressurizing rotational position. The separating cam face 61*a*, the contacting cam face 61*b*, the first oblique cam face 61*c*, and the second oblique cam face 61*d* are formed on the same side of the cam body 61 as the side, on which the detectable piece 62 protrudes.

The separating cam face 61*a* spreads orthogonally to the axial direction of the rotation shaft 60*a* and is located closer than a position of the flange 72*e* in the joint 72*c*, when the joint 72*c* is in the natural state, to the stationary coupling member 71.

The contacting cam face 61*b* spreads orthogonally to the axial direction of the rotation shaft 60*a* and is located closer than the position of the flange 72*e* in the joint 72*c*, when the joint 72*c* is in the natural state, to the coupling body 72*b*.

The first oblique cam face 61*c* is located between a frontward end of the contacting cam face 61*b* and a rearward end of the separating cam face 61*a*, with regard to the first rotating direction. The first oblique cam face 61*c* extends obliquely frontward, with regard to the first rotating direction, from the frontward end of the contacting cam face 61*b* to form an inclined surface. A rearward end of the first oblique cam face 61*c* with regard to the first rotating direction is continuous with the frontward end of the contacting cam face 61*b*. A frontward end of the first oblique cam face 61*c*, with regard to the first rotating direction, is located at a same position as the separating cam face 61*a* with regard to the axial direction of the rotation shaft 60*a*. The rearward end of the first oblique cam face 61*c*, with regard to the first rotating direction, is at a same position as the contacting cam face 61*b* with regard to the axial direction of the rotation shaft 60*a*.

The second oblique cam face 61d is located between a rearward end of the contacting cam face 61b, with regard to the first rotating direction, and a frontward end of the separating cam face 61a, with regard to the first rotating direction. The second oblique cam face 61d extends obliquely from the rearward end of the contacting cam face 61b to the frontward end of the separating cam face 61a to form an inclined surface. A frontward end of the second oblique cam face 61d with regard to the first rotating direction is continuous with the rearward end of the contacting cam face 61b. A rearward end of the second oblique cam face 61d with regard to the first rotating direction is continuous with the frontward end of the separating cam face 61a. The frontward end of the second oblique cam face 61d, with regard to the first rotating direction, is located at a same position as the contacting cam face 61b with regard to the axial direction of the rotation shaft 60a. The rearward end of the second oblique cam face 61d, with regard to the first rotating direction, is at a same position as the separating cam face 61a with regard to the axial direction of the rotation shaft 60a.

At the rearward end of the contacting cam face 61b with regard to the first rotating direction, formed is a protrusion 61e, which protrudes on the side of the coupling body 72b with regard to the axial direction of the rotating shaft 60a. Meanwhile, the cam body 61 includes a no-cam range 61f, in which no cam face is formed, between the first oblique cam face 61c and the separating cam face 61a with regard to the first rotating direction.

When the cam member 60 is at a rotational position, in which the separating cam face 61a is located at a position coincident with the flange 72e, in other words, in which the separating cam face 61a overlaps the flange 72e in the view along the axial direction of the rotation shaft 60a, the separating cam face 61a is located closer than the position of the flange 72e, when the joint 72c is in the natural state, to the stationary coupling member 71. In this position, the separating cam face 61a is separated from the flange 72e along the axial direction of the rotation shaft 60a without contacting the flange 72e.

In this arrangement within the coupling member 70, without being restricted by the separating cam face 61c, the joint 72c may be moved toward the stationary coupling member 71 by the urging force of the spring 72f to be inserted in the stationary coupling member 71 so that the engageable claw 72d in the joint 72c is engaged with the stationary coupling member 71.

Meanwhile, when the cam member 60 is at a rotational position, where the no-cam range 61f is located at the position coincident with the flange 72e (see also FIGS. 3-4), the cam body 61 and the flange 72e do not contact each other; therefore, the engageable claw 72d in the joint 72c may be engaged with the stationary coupling member 71 as well.

Thus, the cam body 61 may be separated from the flange 72e when the cam member 60 is at the rotational position, in which the separating cam face 61a is at the position coincident with the flange 72e, and at the rotational position, in which the no-cam range 61f is at the position coincident with the flange 72e. In other words, a separated rotational position for the cam member 60 includes the rotational position, in which the separating cam face 61a is at the position coincident with the flange 72e, and the rotational position, in which the no-cam range 61f is at the position coincident with the flange 72e.

On the other hand, when the cam member 60 is at a rotational position, in which the contacting cam face 61b is at the position coincident with the flange 72e, in other words, in which the contacting cam face 61b overlaps the flange 72e in the view along the axial direction of the rotation shaft 60a, the contacting cam face 61b is located closer than the position of the flange 72e, when the joint 72c is the natural state, to the coupling body 72b. Therefore, the contacting cam face 61b tending to be closer to the coupling body 72b may contact the flange 72e to urge the flange 72e toward the coupling body 72b.

Therefore, within the coupling member 70, the joint 72c may be moved toward the coupling body 72b against the urging force of the spring 72f to be detached from the stationary coupling member 71 so that the joint 72c is separated from the stationary coupling member 71. Thus, the cam member 60 may urge the flange 72e toward the coupling body 72b when the cam member 60 is at the rotational position, in which the contacting cam face 61b is located at the position coincident with the flange 72e. In other words, a pressurizing rotational position for the cam member 60 includes the rotational position, in which the contacting cam face 61b is located at the position coincident with the flange 72e.

Meanwhile, when the cam member 60 rotates in the first rotating direction from a rotational position, in which the frontward end of the first oblique cam face 61c with regard to the first rotating direction is located at the position coincident with the flange 72e, the first oblique cam face 61c may contact the flange 72e and urge the flange 72e toward the coupling body 72b so that the joint 72c may be moved toward the coupling body 72b. A moved distance for the joint 72c moved toward the coupling body 72b increases as the cam member 60 rotates further in the first rotating direction. When a boundary between the first oblique cam face 61c and the contacting cam face 61b reaches the position coincident with the flange 72e, the moved distance is increased to be equal to a distance, for which the joint 72c is moved toward the coupling body 72b when the contacting cam face 61b contacts the flange 72e, in which the coupling member 70 is placed in the non-transmittable state.

On the other hand, as the cam member 60 rotates further in the first rotating direction from a rotational position, in which a boundary between the contacting cam face 61b and the second oblique cam face 61d is located at the position coincident with the flange 72e, the flange 72e starts contacting the second oblique cam face 61d. The moved distance for the joint 72c moved toward the coupling body 72b may be reduced as the cam member 60 rotates further in the first rotating direction. When a boundary between the second oblique cam face 61d and the separating cam face 61a reaches the position coincident with the flange 72e, the flange 72e may be separated from the cam member 60. Therefore, the joint 72c recovers to the natural state, and the coupling member 70 is placed in the transmittable state. Thus, the cam member 60 may switch the states in the coupling member 70 between the transmittable state and the non-transmittable state by rotating and changing the rotational positions thereof.

The detectable piece 62 is formed to extend in a curve along the first rotating direction from a position in a range, in which the separating cam face 61a is formed, to a frontward position from a range, in which the first oblique cam face 61c is formed with regard to the first rotating direction. In other words, a rearward end 62b of the detectable piece 62 with regard to the first rotating direction is located in a phase of the separating cam face 61a, and a frontward end 62a of the detectable piece 62 with regard to the first rotating direction is located in a phase frontward from a phase of the first oblique cam face 61c.

The electromagnetic clutch 88 is connected with the controller 10 so that electrical power supply to the electromagnetic clutch 88 is controlled by the controller 10. The electromagnetic clutch 88 connects the cam driver gear 86 with the cam member 60 in a powered state, i.e., when the electrical power is supplied, and disconnects the cam member 60 from the cam driver gear 86 in a non-powered state, i.e., when no electrical power is supplied. When the cam driver gear 86 and the cam member 60 are connected with each other by the electromagnetic clutch 88, the driving force is transmitted from the cam driver gear 86 to the cam member 60 to rotate. When the cam driver gear 86 and the cam member 60 are disconnected from each other at the electromagnetic clutch 88, the driving force from the cam driver gear 86 is not transmitted to the cam member 60, and the cam member 60 may not rotate.

The photo sensor 89 may be a light-transmittable photo sensor having an emitter 82a and a receiver 82b, which are arranged spaced apart from each other to face each other. The detectable piece 62 may move through the position between the emitter 82a and the receiver 82b as the cam member 60 rotates. The photo sensor 89 is either in a closed state, in which the detectable piece 62 is present at the position between the emitter 82a and the receiver 82b, and in an open state, in which the detectable piece 62 is absent at the position between the emitter 82a and the receiver 82b, depending on a rotational position of the cam member 60.

When the photo sensor 89 is in the closed state, in which the detectable piece 62 is present at the position between the emitter 82a and the receiver 82b, light emitted from the emitter 82a is blocked by the detectable piece 62 without reaching the receiver 82b, and no signal is output. When the photo sensor 89 is in the open state, in which the detectable piece 62 is absent at the position between the emitter 82a and the receiver 82b, the light emitted from the emitter 82a may reach the receiver 82b, and a signal may be output. The photo sensor 89 is connected with the controller 10.

The controller 10 may stop supplying the electric power to the electromagnetic clutch 88 in response to transition of the states of the photo sensor 89 between the closed state and the open state. In this regard, the controller 10 stops the electrical power supply to the electromagnetic clutch 88 after a predetermined length of time from state transition of the photo sensor 89 from the closed state to the open state. Further, the controller 10 stops the electrical power supply to the electromagnetic clutch 88 after a predetermined length of time from state transition of the photo sensor 89 from the open state to the closed state.

In other words, the photo sensor 89 may detect a rotational position of the cam member 60 at the time when the states of the photo sensor 89 are switched between the closed state and the open state, and the controller 10 may switch the electrical power supply to the electromagnetic clutch 88 in response to the rotational position of the cam member 60 detected by the photo sensor 89.

[Behaviors of the Driving Force Transmitter]

Behaviors of the driving force transmitter 6 configured as described above will be described below. First, a behavior of the driving force transmitter 6 when the states of the coupling member 70 are switched from the transmittable state to the non-transmittable state will be described.

Figure 3:
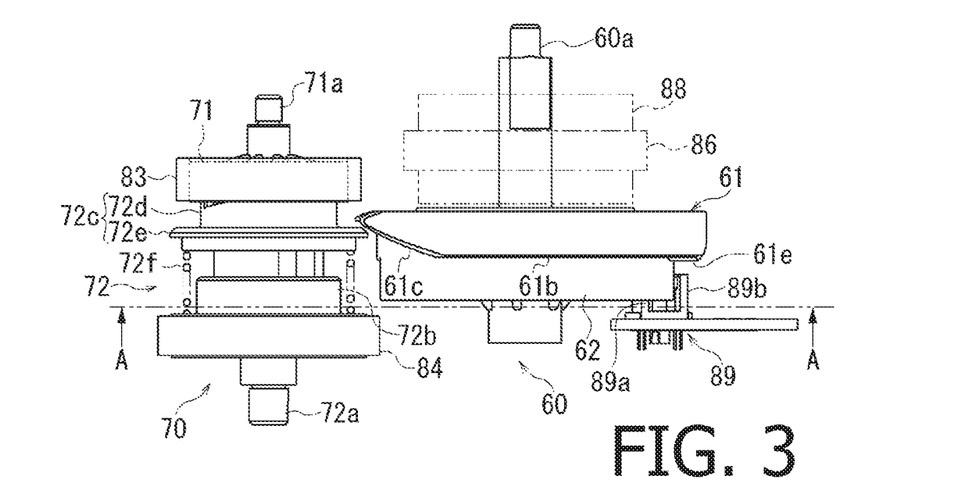
FIG. 3 is a side view of a cam member in a separated rotational position and a coupling member in a transmittable state in the driving force transmitter according to the embodiment of the present disclosure.
Figure 4:
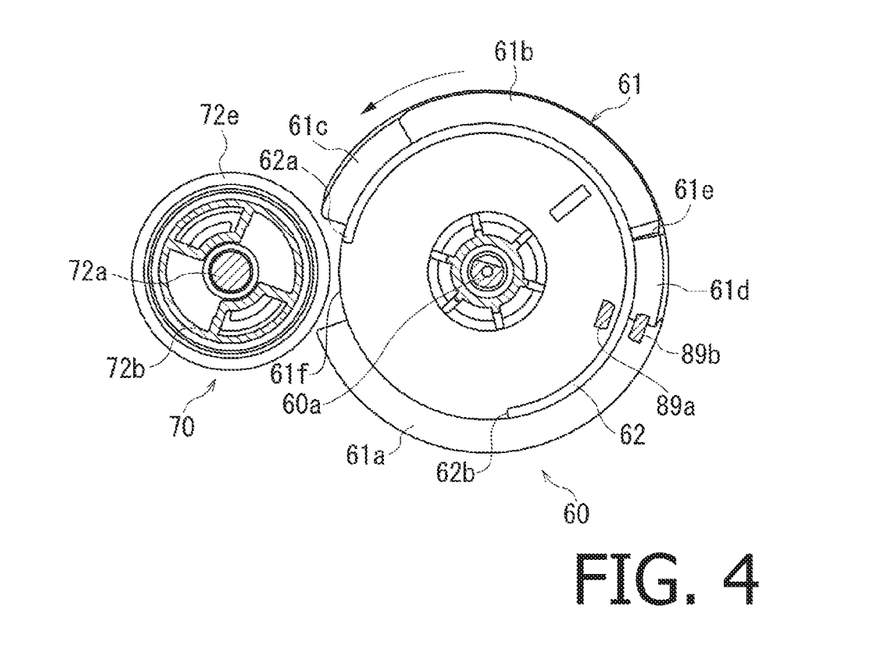
FIG. 4 is a cross-sectional view of the cam member and the coupling member according to the embodiment of the present disclosure viewed at a line A-A indicated in FIG. 3.
Figure 5:
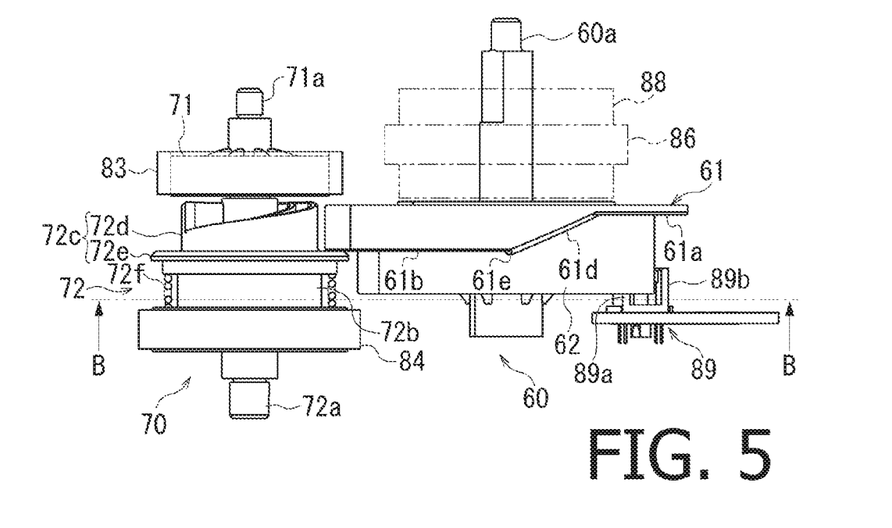
FIG. 5 is a side view of the cam member in a pressurizing rotational position and the coupling member in a non-transmittable condition in the driving force transmitter according to the embodiment of the present disclosure.
Figure 6:
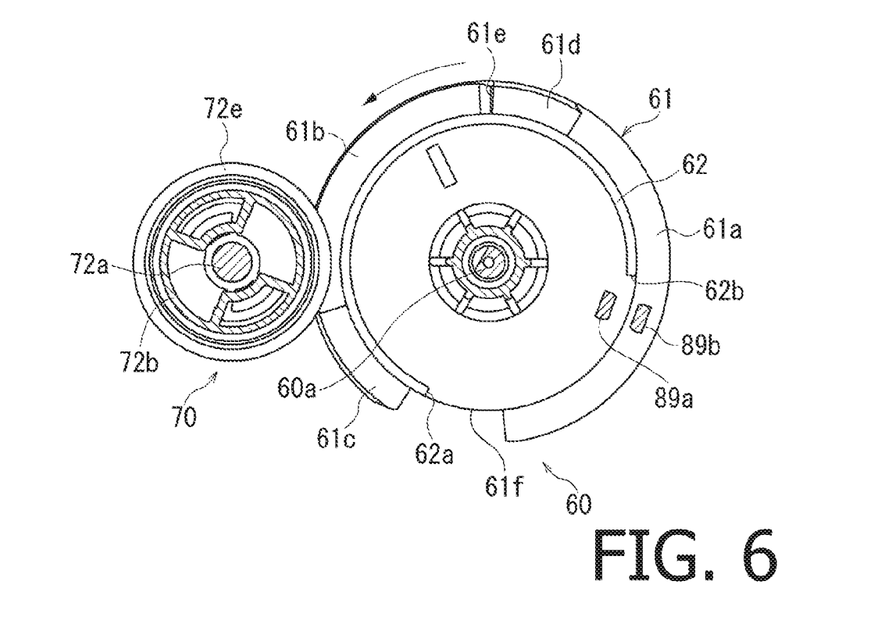
FIG. 6 is a cross-sectional view of the cam member and the coupling member according to the embodiment of the present disclosure viewed at a line B-B indicated in FIG. 5.
Figure 7:
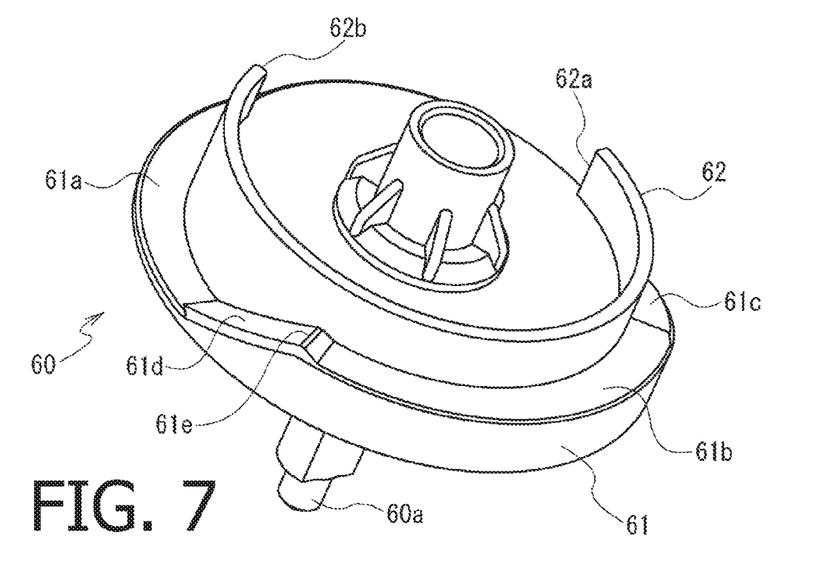
FIG. 7 is a perspective view of the cam member according to the embodiment of the present disclosure.
Figure 8:
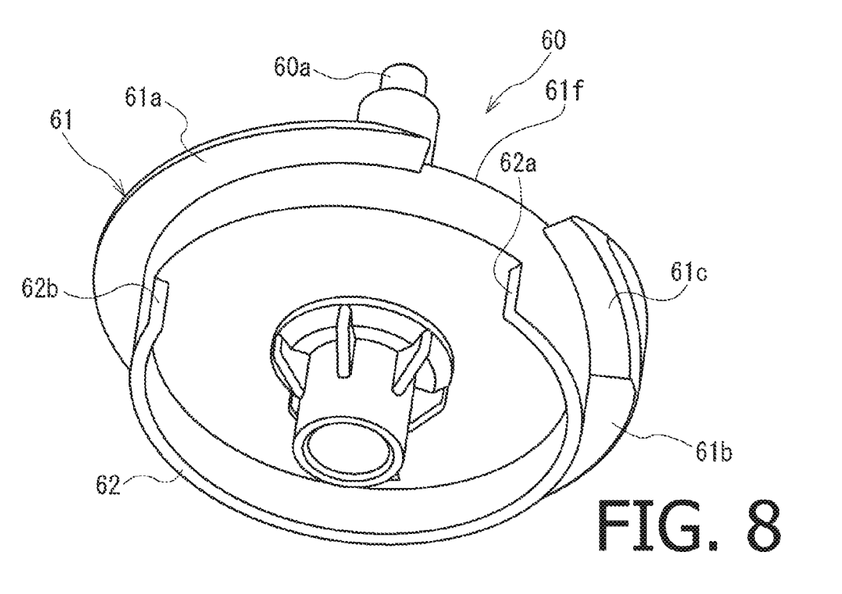
FIG. 8 is another perspective view of the cam member according to the embodiment of the present disclosure.

When the cam member 60 is at the rotational position shown in FIGS. 3-4, the no-cam range 61f is located at the position coincident with the flange 72e. In this rotational position, the cam body 61 is separated from the flange 72e, and the coupling member 70 is in the transmittable state. Meanwhile, the photo sensor 89 is in the closed state.

Figure 9:
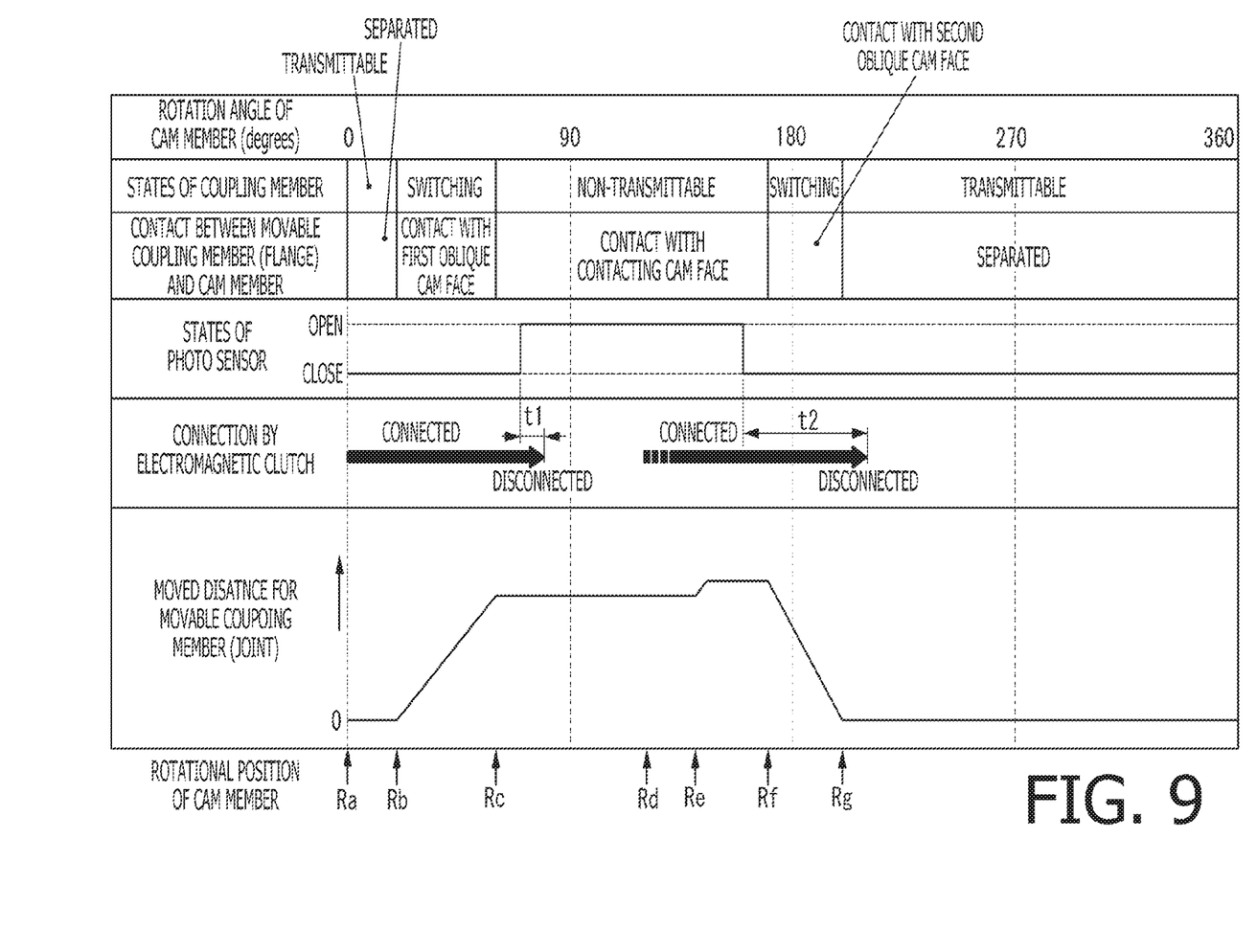
FIG. 9 is a diagram to illustrate behaviors of the driving force transmitter associated with rotational positions of the cam member according to the embodiment of the present disclosure.

The rotational position of the cam member 60 shown in FIGS. 3-4 will be referred to as a rotational position Ra (see FIG. 9). In order to switch the states of the coupling member 70 from the transmittable state to the non-transmittable state through the cam member 60, the controller 10 may supply electrical power to the electromagnetic clutch 88 to establish the connection between the cam driver gear 86 and the cam member 60, and the cam member 60 may be rotated from the rotational position Ra in the first rotating direction.

The cam member 60 being rotated may reach a rotational position Rb (see FIG. 9), in which the frontward end of the first oblique cam face 61c of the cam body 61 is located at the position coincident with the flange 72e. As the cam member 60 rotates further in the first rotating direction from the rotational position Rb, the first oblique cam face 61a may contact the flange 72e, and the joint 72c may move toward the coupling body 72b. A moved distance for the joint 72c moved toward the coupling body 72b increases as the cam member 60 rotates further until the cam member 60 reaches a rotational position Rc (see FIG. 9), in which the boundary between the first oblique cam face 61c and the contacting cam face 61b is located at the position coincident with the flange 72e. When the cam member 60 reaches the rotational position Rc, the moved distance for the joint 72c moved toward the coupling body 72b is equal to the moved distance for the joint 72c to be moved when the flange 72e is in contact with the contacting cam face 61b.

When the cam member 60 reaches the rotational position Rc, the coupling member 70 is shifted to the non-transmittable state. Thereafter, the states of the photo sensor 89 are switched from the closed state to the open state, i.e., the photo sensor 89 detects the rotational position of the cam member 60, in which the state of the coupling member 70 has been switched from the transmittable state to the non-transmittable state.

Meanwhile, after a predetermined length of time t1 since the switch of the photo sensor 89 from the closed state to the open state, the controller 10 stops the electrical power supply to the electromagnetic clutch 88 so that the cam member 60 is disconnected from the cam driver gear 86 to stop rotating. As the cam member 60 stops rotating, the contact between the flange 72e and the contacting cam face 61b are maintained, and the coupling member 70 is maintained in the non-transmittable state.

At the time when the photo sensor 89 switches from the closed state to the open state, i.e., at the time when the photo sensor 89 detects the rotational position of the cam member 60, in which the coupling member 70 is in the non-transmittable state, a smaller portion of the flange 72e that overlaps the cam body 61 may contact the contacting cam face 61b. However, as the cam member 60 further rotates in the first rotating direction, the portion of the flange 72e to contact the contacting cam face 61b increases so that the part of the flange 72e that overlaps the cam body 61 may entirely contact the contacting cam face 61b (see FIG. 6).

In this regard, the predetermined length of time t1 is designed such that the timing, when the controller 10 stops the electrical power supply to the electromagnetic clutch 88 to stop the rotation of the cam member 60, should coincide with the timing, when the cam member 60 reaches the rotational position where the part of the flange 72e that overlaps the cam body 61 should entirely contact the contacting cam face 61b.

Thus, the driving force transmitter 6 is configured such that the electrical power is supplied to the electromagnetic clutch 88 solely when the states of the coupling member 70 are switched from the transmittable condition to the non-transmittable condition. In other words, once the state of the coupling member 70 is switched to the non-transmittable state, the state of the electromagnetic clutch 88 may be maintained without the electrical power supply. Therefore, while the coupling member 70 is maintained in the non-transmittable state, the electromagnetic clutch 88 may not require the electrical power supply, and power consumption by the electromagnetic clutch 88 may be reduced.

Next, a behavior of the driving force transmitter 6 when the states of the coupling member 70 is switched from the non-transmittable state to the transmittable state will be described.

When the cam member 60 is at a rotational position Rd (see FIG. 9), in which the contacting cam face 61b is located at the position coincident with the flange 72e, the flange 72e contacts the contacting cam face 61b, and the coupling member 70 is in the non-transmittable state. Meanwhile, the photo sensor 89 is in the open state.

In order to switch the states of the coupling member 70 from the non-transmittable state to the transmittable state through the cam member 60, the controller 10 supplies electrical power to the electromagnetic clutch 88 to establish the connection between the cam driver gear 86 and the cam member 60, and the cam member 60 is rotated from the rotational position Rd in the first rotating direction.

The cam member 60 is rotated further while the flange 72e is in contact with the contacting cam face 61b. When the cam member 60 reaches a rotational position Re (see FIG. 9), in which the rearward end of the contacting cam face 61b is located at the position to coincide with the flange 72e, the protrusion 61e may climb on the flange 72e. Therefore, the joint 72c may move further closer to the coupling body 72b than the position of the flange 72e when the flange 72e contacts the contacting cam face 61b.

As the cam member 60 rotates further, the protrusion 61e may climb over the flange 72e, and the cam member 60 may reach a rotational position Rf (see FIG. 9), in which the flange 72e starts contacting the second oblique cam face 61d. As the cam member 60 rotates further while the second oblique cam face 61d is in contact with the flange 72e, the moved distance for the joint 72c moved is reduced. When the cam member 60 reaches a rotational position Rg (see FIG. 9), in which the boundary between the second oblique cam face 61d and the separating cam face 61a is located at the position coincident with the flange 72e, the flange 72e is separated from the cam body 61, and the coupling member 70 is shifted to the transmittable state.

While the cam member 60 rotates from the rotational position Rd to the rotational position Rg, when the cam member 60 reaches a rotational position, in which the rearward end of the contacting cam face 61b is located at the position coincident with the flange 72e, e.g., a rotational position between the rotational position Re and the rotational position Rf, the states of the photo sensor 89 are switched from the open state to the closed state so that the photo sensor 89 may detect the rotational position of the cam member 60, in which the coupling member 70 is about to be switched from the non-transmittable state to the transmittable state.

After a predetermined length of time t2 since the detection of the rotational position of the cam member 60, in which the coupling member 70 is about to be switched from the non-transmittable state to the transmittable state, by the photo sensor 89, the controller 10 stops the electrical power supply to the electromagnetic clutch 88 so that the cam member is disconnected from the cam driver gear 86 to stop rotating. In this regard, the predetermined length of time t2 is designed such that the timing, when the controller 10 stops the electrical power supply to the electromagnetic clutch 88 to stop the rotation of the cam member 60, should coincide with the timing, after the cam member 60 reaches the rotational position Rg.

Therefore, at the time when the cam member 60 stops rotating, the flange 72e is separated from the cam body 61, and the coupling member 70 has been switched to the transmittable state so that the transmittable state of the coupling member 70 should be maintained thereafter.

Thus, the driving force transmitter 6 is configured such that the electrical power is supplied to the electromagnetic clutch 88 when the states of the coupling member 70 are switched from the non-transmittable state to the transmittable state. In other words, once the state of the coupling member 70 is switched to the transmittable state, the electromagnetic clutch 88 may be maintained without the electrical power supply. Therefore, even when the coupling member 70 is maintained in the transmittable state for a longer period of time, the electromagnetic clutch 88 may not require the electrical power, and power consumption by the electromagnetic clutch 88 may be reduced.

[Behavior of the Protrusion on the Contacting Cam Face to Restrict the Cam Member from Rotating]

When the electromagnetic clutch 88 in the driving force transmitter 6 is in the non-powered state, the cam member 60 is released from the motor 11 to be freely rotatable. Therefore, for example, when the cam member 60 is at the pressurizing rotational position, in which the contacting cam face 61b is at the position to coincide with the flange 72e, while the coupling member 70 is in the non-transmittable state, if the electromagnetic clutch 88 is shifted to the non-powered state, the cam member 60 may be rotated in the first rotating direction by an unintended external force due to, for example, jiggling or vibration caused in the driving force transmitter 6.

When the cam member 60 is rotated in the first rotating direction to a rotational position, in which the separating cam face 61 is located at the position coincide with the flange 72e, the states of the coupling member 70 may be switched from the non-transmittable state to the transmittable state undesirably or unintentionally.

In this regard, in the driving force transmitter 6 according to the present disclosure, formed is the protrusion 61e at the rearward end of the contacting cam face 61b with regard to the first rotating direction. The protrusion 61e has a substantial height, which should collide with the flange 72e so that the protrusion 61e may be restricted from forcibly climbing over the flange 72e by the external force and the cam member 60 may be restricted from being rotated over the flange 72e.

Thus, the cam member 60 at the pressurizing rotational position, which may otherwise be freely rotatable, may not be rotated over the flange 72e but may be rotatable within the range, in which the contacting cam face 61b is located at the position coincident with the flange 72e. Therefore, the coupling member 70 may be prevented from being shifted to the transmittable state undesirably.

Meanwhile, for another example, when the cam member 60 is in the separated rotational position, in which the separating cam face 61a is located at the position coincident with the flange 72e, while the coupling member 70 is in the transmittable state, if the electromagnetic clutch 88 is in the non-powered state, the cam member 60 may be rotated in the first rotating direction by an unintended external force due to, for example, jiggling or vibration caused in the driving force transmitter 6.

When the cam member 60 is rotated in the first rotating direction to a rotational position, in which the contacting cam face 61*b* is located at the position coincide with the flange 72*e*, the coupling member 70 may be shifted from the transmittable state to the non-transmittable state undesirably or unintentionally.

In this regard, when the cam member 60 in the separated rotational position tends to rotate in the first rotating direction, the first oblique cam face 61*c* may contact the flange 72*e*, which may be therefore urged by the first oblique cam face 61*a* toward the coupling body 72*b*. The urging force produced by the contact between the flange 72*e* and the first oblique cam face 61*c* may affect on the cam member 60 as a load that may prevent the cam member 60 from being rotated to a rotational position, where the contacting cam face 61*b* contacts the flange 72*e*. Thus, the coupling member 70 may be prevented from being placed in the non-transmittable state undesirably.

[Modified Examples of the Driving Force Transmitter]

Although an example of carrying out the invention has been described, those skilled in the art will appreciate that there are numerous variations and permutations of the driving force transmitter, the extension sheet feeder, and the image forming apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the cam member 60 in the driving force transmitter 6 may not necessarily be rotatable solely in the first rotating direction by the driving force from the motor 11 but may be rotatable in the first rotating direction and in a second rotating direction, which is a reversed direction to the first rotating direction.

Figure 10:
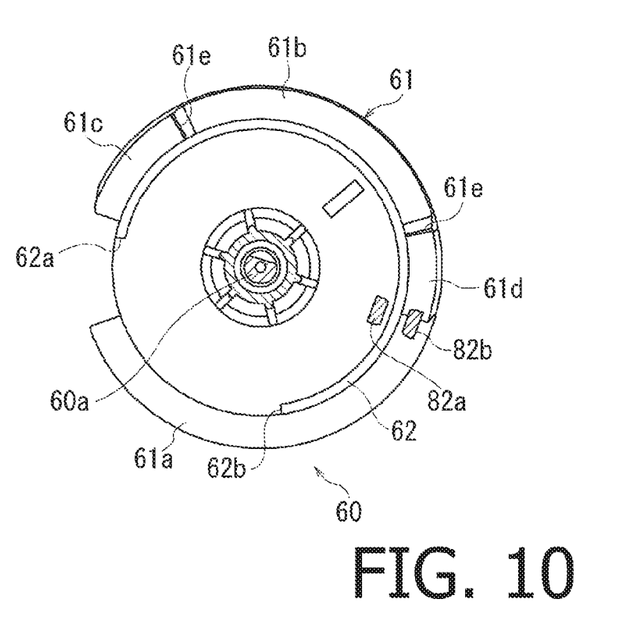
FIG. 10 is a cross-sectional view at a bottom of the cam member with protrusions at a frontward end and a rearward end with regard to a first rotating direction according to the embodiment of the present disclosure.

When the cam member 60 is configured to be rotatable in the first and second rotating directions, the protrusion 61*e* may be formed at each of the frontward end and the rearward end of the contacting cam face 61*b* along the first or the second rotating direction, as shown in FIG. 10. In this regard, each protrusion 61*e* may have a substantial height, which should collide with the flange 72*e* so that the protrusion 61*e* may be restricted from forcibly climbing over the flange 72*e* by the external force and the cam member 60 may be restricted from being rotated over the flange 72*e*.

According to this exemplary configuration, when the cam member 60 is at the pressurizing rotational position, and when the electromagnetic clutch 88 is in the non-powered state, if the cam member 60 tends to rotate by the unintentional external force caused in the driving force transmitter 6, the cam member 60 may be prevented from rotating in the first rotating direction by the rearward one of the protrusions 61*e* with regard to the first rotating direction and may be prevented from rotating in the second rotating direction by the frontward one of the protrusions 61*e* with regard to the first rotating direction. Thus, the coupling member 70 may be prevented from being shifted to the transmittable state undesirably even when the cam member 60 is rotatable in the first rotating direction and the second rotating direction.

Meanwhile, when the cam member 60 is at the separated rotatable position, and when the electromagnetic clutch 88 is in the non-powered state, if the cam member 60 tends to rotate by the unintentional external force caused in the driving force transmitter 6, the cam member 60 may be prevented from rotating in the first rotating direction by the first oblique cam face 61*c* and may be prevented from rotating in the second rotating direction by the second oblique cam face 61*d*. Thus, the coupling member 70 may be prevented from being shifted to the non-transmittable state undesirably even when the cam member 60 is rotatable in the first rotating direction and the second rotating direction.

[Benefits]

The driving force transmitter 6 in the present embodiment includes, as has been described, the coupling member 70 arranged between the motor 11 and the separator roller 33 to be driven by the driving force from the motor 11. States in the coupling member 70 are switchable between the transmittable state, in which the driving force from the motor 11 is transmitted to the separator roller 33, and the non-transmittable state, in which the driving force from the motor 11 is not transmitted to the separator roller 33. The coupling member 70 includes the stationary coupling member 71 to rotate about the rotation shaft 71. The movable coupling member 72 to move along the axial direction of the rotation shaft 71*a* to be engageable with and separable from the stationary coupling member 71. The engageable claw 72*d* of the joint 72*c* in the movable coupling member 72 is engageable with the stationary coupling member 71 so that the movable coupling member 72 is engaged with the stationary coupling member 71 to be rotatable integrally with the stationary coupling member 71. The engagement of the movable coupling member 72 with the stationary coupling member 71 forms the transmittable state, and separation of the movable coupling member 72 from the stationary coupling member 71 forms the non-transmittable state. The driving force transmitter 6 further includes the cam member 60 to be rotated about the rotation shaft 60*a* by the driving force from the motor 11 to switch the transmittable state and the non-transmittable state in the coupling member 70 by changing rotational positions thereof. The driving force transmitter 6 further includes the electromagnetic clutch 88 arranged between the motor 11 and the cam member 60. The electromagnetic clutch 88 connects the cam member 60 with the motor 11 when the electromagnetic clutch 88 is electrically powered and disconnects the cam member 60 from the motor 11 when the electromagnetic clutch 88 is not electrically powered. The driving force transmitter 6 further includes the photo sensor 89 to detect the rotational positions of the cam member 60 and the controller 10. The controller 10 supplies electrical power to the electromagnetic clutch 88 to rotate the cam member 60 to switch the states in the coupling member 70 between the transmittable state and the non-transmittable state and stops the electrical power to the electromagnetic clutch 88 after the states in the coupling member 70 are completely switched. The controller 10 switches the electrical power to the electromagnetic clutch 88 according to the rotational positions of the cam member detected by the sensor.

In this regard, the image forming apparatus 1 has the driving force transmitter 6, the motor 11, and the image forming unit 5 to be driven by the motor 11.

Further, the extension sheet feeder 103 is attachable to the image forming apparatus 1 having the motor 11. The extension sheet feeder 103 may have the driving force transmitter 6, the sheet cassette 131, and the separator roller 133 to be driven by the motor 11. The sheet cassette 131 may support the sheets S thereon, and the separator roller 133 may separate and convey the sheets S supported on the sheet cassette 131 one by one.

According to the driving force transmitter 6 in the embodiment described above, the electromagnetic clutch 88 may be electrically powered at least when the states of the coupling member 70 are switched between the transmittable state and the non-transmittable state. In other words, the electromagnetic clutch 88 may not necessarily be electrically powered continuously in order to be maintained in the transmittable state or the non-transmittable state. Therefore, an amount of electrical power consumption in the electromagnetic clutch 88 may be reduced. Meanwhile, the driving force from the motor 11 to the separator roller 33 may be transmitted through the coupling member 70, not through the electromagnetic clutch 88. Therefore, the electromagnetic clutch 88 may be downsized to a less powerful electromagnetic clutch, which may substantially transmit a driving force required to merely switch the states of the coupling member 70 between the transmittable state and the non-transmittable state, in a shorter period of time required for switching the states of the coupling member 70. In other words, the amount of power consumption in the electromagnetic clutch 88 may be reduced effectively.

Further, the stationary coupling member 71 is connected with the motor 11, and the movable coupling member 72 is connected with the separator roller 33. The coupling member 70 has the spring 72d to urge the joint 72c toward the position where the engageable claw 72d of the joint 72c in the movable coupling member 72 is engaged with the stationary coupling member 71. The cam member 60 is rotatable between the separated rotational position, in which the cam member 60 is separated from the flange 72e of the joint 72c in the movable coupling member 72, and the pressurizing rotational position, in which the cam member 60 presses the flange 72e in the direction to separate the joint 72c in the movable coupling member 72 from the stationary coupling member 71. When the cam member 60 is in the separated rotational position, the joint 72c in the movable coupling member 72 urged by the spring 72f is engaged with the stationary coupling member 60 to form the transmittable state in the coupling member 70. When the cam member 60 is in the pressurizing rotational position, the joint 72c in the movable coupling member 72 pressed by the cam member 60 is separated from the stationary coupling member 71 against the urging force of the spring 72f to form the non-transmittable condition in the coupling member 70.

When the coupling member 70 is in the transmittable state, the cam member 60 is at the separated rotational position separated from the movable coupling member 72. Therefore, no friction force may be produced between the cam member 60 and the movable coupling member 72, and the movable coupling member 72 may be prevented from being affected by an unnecessary load or from being frictionally damaged. On the other hand, when the coupling member 70 is in the non-transmittable state, the cam member 60 may urge the flange 72e in the movable coupling member 72. In this regard, however, the movable coupling member 72 in the non-transmittable state should not rotate. Therefore, the movable coupling member 72 may still be prevented from being affected by the unnecessary load due to the friction caused between the cam member 60 and the movable coupling member 72.

Further, the cam member 60 is rotatable about the rotation shaft 60a by the driving force from the motor 11 in the first rotating direction and in the second rotating direction being the reversed direction to the first direction. The cam member 60 has the contacting cam face 61b, which may contact the flange 72e in the movable coupling member 72 when the cam member 60 is in the pressurizing rotational position. The cam member 60 disconnected from the motor 11 when the electromagnetic clutch 88 is not electrically powered is freely rotatable. The protrusion 61e protruding toward the coupling body 72b in the movable coupling member 72 is formed at each end of the contacting cam face 61b along the first and second rotating directions. The protrusion has the height, by which the protrusion 61e on the cam member 60 in the pressurizing rotational position is restricted from climbing on the flange 72e in the movable coupling member to be rotated over the flange 72e when the electromagnetic clutch 88 is not electrically powered.

Therefore, when the electromagnetic clutch 88 is in the non-powered state, the cam member 60 may be restricted from being rotated by an external force caused in the driving force transmitter 6 for a rotational amount beyond a border between the separated rotational position and the pressurizing rotational position. Thus, the coupling member 70 may be prevented from being shifted between the non-transmittable state and the transmittable state undesirably.

Alternately, the cam member 60 may be rotatable about the rotation shaft 60a by the driving force from the motor 11 in the first rotating direction. The protrusion 61e protruding toward the coupling body 72b in the movable coupling member 72 may be formed at the end of the contacting cam face 61b with regard to the first rotating direction. The protrusion may have the height, by which the protrusion 61e on the cam member 60 in the pressurizing rotational position is restricted from climbing on the flange 72e in the movable coupling member to be rotated in the first rotating direction over the flange 72e when the electromagnetic clutch 88 is not electrically powered.

Therefore, when the electromagnetic clutch 88 is in the non-powered state, the cam member 60 may be restricted from being rotated by an external force caused in the driving force transmitter 6 for a rotational amount beyond a border between the separated rotational position and the pressurizing rotational position. Thus, the coupling member 70 may be prevented from being shifted between the non-transmittable state and the transmittable state undesirably.

What is claimed is:
1. A driving force transmitter, comprising:
a coupling member arranged between a driving source and a driven device configured to be driven by a driving force from the driving source, states in the coupling member being switchable between a transmittable state, in which the driving force from the driving source is transmitted to the driven device, and a non-transmittable state, in which the driving force from the driving source is not transmitted to the driven device, the coupling member comprising:
a first shaft;
a second shaft;
a stationary coupling member configured to rotate about the first shaft; and
a movable coupling member configured to move along an axial direction of the first shaft between a separated position, in which the movable coupling member is separated from the stationary coupling member, and an engaging position, in which the movable coupling member engages with the stationary coupling member and is rotatable integrally with the stationary coupling member,
when the coupling member is in the transmittable state, the movable coupling member being at the engaging position, and when the coupling member is in the non-transmittable state, the movable coupling member being at the separated position;

a cam member configured to be rotated about the second shaft by the driving force from the driving source to move the movable coupling member between the separated position and the engaging position by changing rotational positions thereof;

an electromagnetic clutch arranged between the driving source and the cam member, the electromagnetic clutch being configured to connect the cam member with the driving source when the electromagnetic clutch is electrically powered and to disconnect the cam member from the driving source when the electromagnetic clutch is not electrically powered;

a sensor configured to detect the rotational positions of the cam member; and a controller, wherein the controller is configured to supply electrical power to the electromagnetic clutch to rotate the cam member to switch the states in the coupling member between the transmittable state and the non-transmittable state and stops the electrical power to the electromagnetic clutch after the states in the coupling member are completely switched; and wherein the controller is configured to switch the electrical power to the electromagnetic clutch according to the rotational positions of the cam member detected by the sensor.

2. The driving force transmitter according to claim 1, wherein the stationary coupling member is connected with the driving source;

wherein the movable coupling member is connected with the driven device;

wherein the coupling member comprises a biasing member configured to bias the movable coupling member in a direction from the separated position toward the engaging position;

wherein the cam member is rotatable between a first rotational position, in which the cam member is separated from the movable coupling member, and a second rotational position, in which the cam member presses the movable coupling member in a direction from the engaging position toward the separated position;

wherein, when the cam member is in the first rotational position, the movable coupling member biased by the biasing member is in the engaging position and the coupling member is in the transmittable state; and wherein, when the cam member is in the second rotational position, the movable coupling member pressed by the cam member is in the separated position against biasing force of the biasing member and the coupling member is in the non-transmittable state.

3. The driving force transmitter according to claim 2, wherein the cam member is rotatable about the second shaft by the driving force from the driving source in a first rotating direction and in a second rotating direction being a reversed direction to the first rotating direction;

wherein the cam member comprises a cam face, the cam face being configured to contact the movable coupling member when the cam member is in the second rotational position;

wherein the cam member disconnected from the driving source, when the electromagnetic clutch is not electrically powered, is freely rotatable;

wherein a protrusion protruding toward the movable coupling member is formed at each end of the cam face along the first and second rotating directions of the cam member; and wherein the protrusion has a height, by which the cam member in the second rotational position is restricted from climbing on the movable coupling member to be rotated over the movable coupling member when the electromagnetic clutch is not electrically powered.

4. The driving force transmitter according to claim 2, wherein the cam member is rotatable about the second shaft by the driving force from the driving source in a first rotating direction;

wherein the cam member comprises a cam face, the cam face being configured to contact the movable coupling member when the cam member is in the second rotational position;

wherein the cam member disconnected from the driving source, when the electromagnetic clutch is not electrically powered, is freely rotatable;

wherein a protrusion protruding toward the movable coupling member is formed at a rearward end of the cam face with regard to the first rotating direction of the cam member; and wherein the protrusion has a height, by which the cam member in the second rotational position is restricted from climbing on the movable coupling member to be rotated over the movable coupling member when the electromagnetic clutch is not electrically powered.

* * * * *